Nov. 17, 1959  C. S. CHAPMAN, JR., ET AL  2,912,876
TRANSMISSION
Filed May 20, 1957  6 Sheets-Sheet 1

Fig. 1

INVENTORS
Charles S. Chapman, Jr., &
BY Kenneth W. Gage
T. L. Chisholm
ATTORNEY

Nov. 17, 1959 C. S. CHAPMAN, JR., ET AL 2,912,876
TRANSMISSION
Filed May 20, 1957 6 Sheets-Sheet 4

INVENTORS
Charles S. Chapman, Jr., &
Kenneth W. Gage
BY
T. R. Chisholm
ATTORNEY

United States Patent Office 2,912,876
Patented Nov. 17, 1959

2,912,876

TRANSMISSION

Charles S. Chapman, Jr., Grand Blanc, and Kenneth W. Gage, Troy, Mich., assignors to General Motors Corporation, Detroit, Mich., a corporation of Delaware Application May 20, 1957, Serial No. 660,157

4 Claims. (Cl. 74—472)

This invention relates to hydrodynamic torque transmitters, their associated gearing and the control mechanism therefor and especially to forms of such devices suitable for transmissions for automobiles.

It is particularly directed to improving the mechanical construction and arrangement of such torque transmitters and gearing and to improving the control mechanism to insure certainty and reliability of operation at high efficiency in the various phases of operation.

In the accompanying drawings:

Fig. 2 being the torque converter, Fig. 2A the gearing and Fig. 2B the output shaft and hill brake of the transmission, Figs. 3 and 3A collectively form a diagram of a control apparatus for the transmission shown in Figs. 2 to 2B.

*General arrangement*

Figure 1:
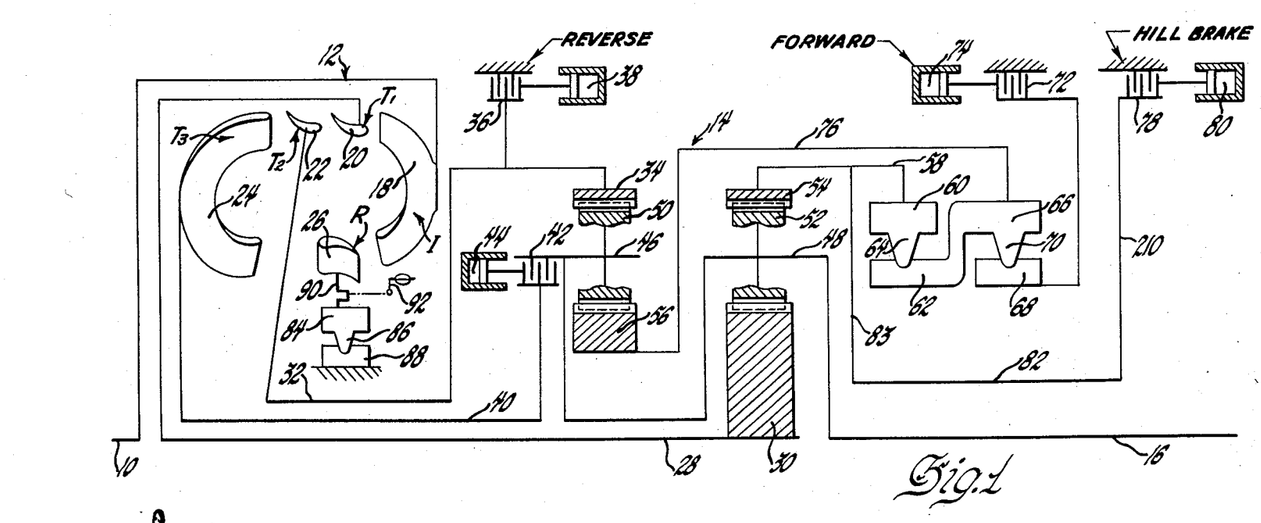
Fig. 1 is a schematic representation of one-half of a symmetrical, longitudinal section of a transmission embodying one form of the invention, Figs. 2, 2A and 2B collectively form one-half of a symmetrical, longitudinal section of an actual structure embodying the form of the invention shown in Fig. 1.

Referring to Fig. 1, the transmission includes an input or engine-driven shaft 10 which drives a hydrodynamic torque converter 12 which in turn drives planetary reduction gearing generally denoted by 14 connected to a final drive shaft 16, which may be the propeller shaft of an automobile. Novel features are included in the construction and arrangement of the reduction gearing separately and in combination with the torque converter and in the control system generally.

The torque converter has a pump or impeller I of known form represented in Fig. 1 by a single blade 18 rotated by the input shaft 10 to circulate working liquid in a closed toroidal path which passes through a first turbine $T_1$ represented by blade 20, a second turbine $T_2$ represented by blade 22, a third turbine $T_3$ represented by blade 24 and a reaction member R represented by blade 26.

The first turbine $T_1$ is connected by shaft 28 to drive a rear input sun gear 30 of the planetary gearing. The second turbine $T_2$ is connected by a shaft 32 to drive forward a front input ring gear 34. For reverse the second turbine and the ring gear 34 can be held fast by any suitable friction torque-establishing device, for example a brake 36 set by any suitable hydraulic cylinder 38, as will be explained.

The third turbine $T_3$ is connected to the principal output shaft 40 of the torque converter which can be connected through any suitable friction torque-establishing device, for example a clutch 42 set by a hydraulic cylinder 44 to drive the carriers 46 and 48, respectively, of the front and rear planetary gear sets which carriers support front planetary pinions 50 meshing with the front input ring gear 34 and rear planetary pinions 52 which mesh with the rear input sun gear 30. A rear reaction ring gear 54 meshing with planetary pinions 52 completes the rear planetary gear set and a reaction sun gear 56 meshing with the front planetary pinions 50 completes the front planetary gear set. The carriers 46—48 are connected to the transmission output shaft 16.

The rear reaction ring gear 54 is connected by a drum 58 to a one-way torque-establishing device, or freewheeler, for example a one-way clutch symbolically represented by an outer race 60 which can rotate forward about the center line of the shaft 16 but is prevented from rotating backward by a ratchet member 64 secured to the outer race 60 and overlapping an inner race 62, which can be held. This symbol represents that the member 60 and member 64 can rotate toward the eye of the observer out of the plane of the paper but cannot rotate in the opposite sense with respect to the race 62 because the member 64 is blocked by the race 62. The inner race 62 is integral with a second outer race 66 rotatable toward the eye of the observer with respect to a second inner race 68 but prevented from rotating in the opposite sense with respect to the race 68 by a ratchet member 70. The inner race 68 can be held fast by a friction torque-establishing device such as the brake 72 which can be set by a hydraulic cylinder 74. The races 62 and 66 are connected to the front reaction sun gear 56 by a drum 76. When the brake 72 is set, race 66 cannot rotate backward and this holds both sun gear 56 and ring gear 54 from rotating backward. However, either the ring gear 54 alone, or both the ring gear and the sun gear 56 can turn forward.

Also, the ring gear 54 can be held against rotation in both senses to provide hill braking by a second brake 78 which can be set by hydraulic cylinder 80 and is connected to the ring gear 54 by a shaft 82 and flange 83.

The stator blades 26, as is customary, are mounted on any suitable support 84 having any known one-way torque-establishing device such as the brake represented by ratchet member 86 secured to the support 84 and overlapping a stationary support 88 so as to permit forward rotation but prevent backward rotation of the stator blades. In order to provide different ranges of torque multiplication for different driving conditions, we make the angles of the reaction blades 26 adjustable by mounting each blade on a crankshaft 90 which can be positioned in any suitable manner, preferably by the structure and control apparatus described below. In general, the crankshafts 90 are suitably connected to an arm 92 which operates the throttle of the engine which drives the car so that the blades can be positioned to vary the range of torque multiplications effected by the torque converter in accord with the torque demand on the engine.

*Operation of general arrangement*

The arrangement so far described operates as follows. Assume that the input shaft 10 is driven by the idling engine of an automobile and that all friction torque-establishing devices are disengaged. The impeller I is now rotating slowly. For forward drive the neutral clutch 42 and the forward friction torque-establishing device 72 are engaged. As engine speed is increased, the impeller impresses higher torque upon the turbines. Initially, the stationary drive wheels of the car hold the carriers 46 and 48 and the turbine $T_3$ stationary. $T_1$ drives the rear input sun gear 30 forward. Because the rear carrier 48 is momentarily held stationary, the rear pinions 52 attempt to drive the rear reaction gear 54 backward. This is prevented by the brake 72 and the two freewheelers 60—64—62 and 66—70—68 both of which are now acting as one-way brakes. The front outer race 60 is locked against reverse rotation with respect to the race 62 by the ratchet members 64; the race 62 is connected to the race 66 and this is locked against reverse rotation by the ratchet blades 70 with respect to the race 68 which is held by the brake 72. Consequently, the ring gear 54 acts as a reaction gear and the carrier 48 is driven slowly forward, multiplying the torque impressed on the turbine $T_1$ by the ratio or mechanical advantage of the rear planetary gear set 54—52—30. This motion of the carrier 48 drives the car and also positively drives forward the front carrier 46 and the third turbine $T_3$ regardless of hydraulic conditions in the torque converter. $T_1$ while exerting its positive drive necessarily runs faster than the output shafts 16 and faster than turbine $T_3$ as determined by the ratio of the rear planetary gear set.

In addition, oil flowing from $T_1$ to $T_2$ exerts torque on $T_2$ which through shaft 32 drives the front ring gear 34 forward tending to rotate the front pinions 50 forward. When the ring gear 34 rotates fast enough, this tends to rotate the front reaction sun gear 56 backward. Such backward rotation is prevented by the front one-way brake 60—64—62 which has previously been locked by the reaction ring gear 54. Consequently, the front ring gear 34 runs at a speed faster than the speed of the carriers as determined by the ratio of the front planetary unit and adds its torque, multiplied by the ratio or mechanical advantage of the front planetary unit 34—50—56, to the output shaft 16.

On starting the car and below some definite speed, depending upon the design of the blades of the torque converter, the third turbine $T_3$ may not exert any positive or forward torque derived from the circulating liquid but as previously stated, it is positively driven by the carriers. However, at some relative speed of input shaft to output shaft, positive hydraulic torque is impressed on $T_3$ and its possible speed due to hydraulic action gradually increases and tends to exceed the actual speed of the carriers driven by the other turbines. At this point $T_3$ assists in driving the car by torque exerted on the main drive line composed of shaft 40, clutch 42, carriers 46 and 48, and output shaft 16.

As the speed of the car increases from standstill, two things happen successively, first, the torque delivered to the output shaft 16 by the first turbine $T_1$ through the rear planetary unit drops to a vanishing point as $T_1$ reaches its terminal speed. When the speed of $T_1$ divided by the torque multiplying ratio of the rear planetary gear set becomes less than the speed of $T_2$ divided by the torque multiplying ratio of the front planetary gear set, the second turbine $T_2$ is driving the carriers and the output shaft 16 faster than $T_1$ can drive them. At this point the carrier 48, through the planetary gears 52, rotates the rear ring gear 54 forward and the front freewheeler 60—64—62 breaks away. $T_1$ idles in the oil stream neither giving up nor absorbing any appreciable torque, $T_2$ is now driving the car assisted by $T_3$. Second, as the speed of the car increases further, $T_2$ reaches its terminal speed and can no longer drive the carriers through the front planetary gear set as fast as $T_3$ can drive them. At this point the front planetary gears 50 drive the sun gear 56 forward, the rear freewheeler 66—70—68 breaks away and $T_2$ idles in the stream of oil. Thereafter, as the speed of the car increases, $T_3$ continues to drive the car alone, either multiplying the torque of the engine or operating in coupling at substantially one-to-one drive, as is known.

Conversely as the speed of the car decreases when $T_3$ is driving the car alone, the point is reached where the carriers tend to rotate slower than the speed of $T_2$ divided by the torque multiplying ratio of the front planetary gear set. Now $T_2$ rotates the ring gear 34 fast enough to attempt to rotate the sun gear 56 backward, this sets the rear freewheeler 66—70—68 so that $T_2$ picks up the drive and assists $T_3$ in driving the car. If the car slows down still more, $T_1$ picks up the drive by rotating the sun gear 30 fast enough to try to rotate the ring gear 54 backward which sets up the front freewheeler 60—64—62 so that $T_1$ picks up the drive and assists the other turbines in driving the car.

For reverse drive the forward friction torque establishing device 78 is released and the reverse friction torque-establishing device 36 is set to hold the front ring gear 34 to act as a reaction gear. This holds $T_2$ stationary during all reverse drive. Now $T_1$ drives the rear input sun gear 30 forward, which because carrier 48 is initially held by the stationary car, impresses reverse torque on the ring gear 54, front outer race 60, ratchet member 64 and front inner race 62. This locks the front freewheeler which now acts as a one-way clutch and positively drives the front sun gear 56 backward. This is permitted indeed, for although the rear freewheeler 66—70—68 tends to lock, the member 68 can rotate backward because it is not opposed by the released forward brake 72. This drives the car backward. It also positively carries the turbine $T_3$ backward. However, it is possible, depending upon the blade design, to impress reverse hydraulic torque on $T_3$ so that it will assist in driving the car. This is because the stationary blade $T_2$ acts as a guide wheel or reaction member directing oil from $T_1$ to the front sides of the $T_3$ blades impressing reverse hydraulic torque on $T_3$.

The rear planetary gear set has a higher mechanical advantage than the front planetary gear set. At any speed the torque delivered to the output shaft 16 by any individual turbine equals the value of hydraulic torque on the turbine, taking into account its algebraic sign or sense of rotation, multiplied by the mechanical advantage of its connection to the output shaft. The mechanical advantage of the connection of turbine $T_3$ to the output shaft is one. Therefore, at stall, that is when the car is stationary but the impeller is rotating, the entire torque converter has a high positive or forward torque ratio in spite of any negative torque on $T_3$. This is because the negative torque of $T_3$ is less than the forward torque composed of the positive high torque of the first turbine multiplied by the mechanical advantage of its connection to the output shaft plus the torque of $T_2$ multiplied by the mechanical advantage of its connection to the output shaft. The torque ratio of the torque converter as a whole decreases with increase in the speed of the output shaft 16 for any substantially constant engine speed or throttle opening, until the speed of the turbine $T_3$ approaches the speed of the impeller I, when the torque ratio is substantially unity and the condition known as coupling occurs.

As is known, the range of torque multiplication effected by the torque converter increases with increase of the angle through which the reaction blades 26 change the direction of the oil between the turbine $T_3$ and the impeller I. The connection of the crankshaft 90 to the engine throttle enables this angle to be progressively varied with change of throttle opening and hence in accordance with change in torque demand on the engine or input shaft. When the torque demand is low as indicated by a small throttle opening, the stator blades are placed in such a position that they change the direction of oil relatively little and so provide a relatively low range of torque multiplication. In this position the blades are said to be at low angle or in low performance position and are, of all their possible positions, most nearly parallel to the axis of the transmission. When the throttle is opened wider, the torque demand on the engine or input shaft is greater and the vanes are moved toward a position transverse to the axis, that is toward high angle or high performance position in which they redirect oil from the turbine $T_3$ through a larger angle to the impeller I. This produces an increased range of torque multiplication.

The transmission described above provides a very effective hill brake which causes the car to tend to drive the engine through a connection having a mechanical advantage of less than one. To establish hill braking the hill brake 78 is engaged, all other friction torque-establishing devices being released. This permits the engine to drive the car. The first turbine drives the rear sun gear 30 which drives the carrier 48 forward as described above in connection with starting the car. Whenever the car tends to run faster than the engine, the planet gears 52 tend to overdrive the sun gear 30, that is tend to drive the sun gear 30 faster than the output shaft 16, because the ring gear is held. This drives turbine $T_1$ and tends to drive it faster than the impeller I is being driven by the engine. Thus $T_1$ becomes in effect an impeller and the impeller I becomes a turbine which tends to drive the engine faster than it is being driven by its own power. The engine thus offers resistance to the forward motion of the car, and this resistance is multiplied by the mechanical advantage of the rear planetary gear set 54—55—30 which is greater than one from the engine to the output shaft 16.

When the hill brake 78 is set and the forward and reverse brakes 72 and 36 are released, the second and third turbines $T_2$ and $T_3$ cannot have any effect on the drive. $T_3$ is completely disconnected from the system by the release of the neutral clutch 42 and although $T_2$ can drive the front ring gear 34, there is nothing to hold the reaction sun gear 56 because brake 72 is released. Consequently, $T_2$ cannot impart torque nor absorb torque from the carrier 46.

Structure

Figure 2:
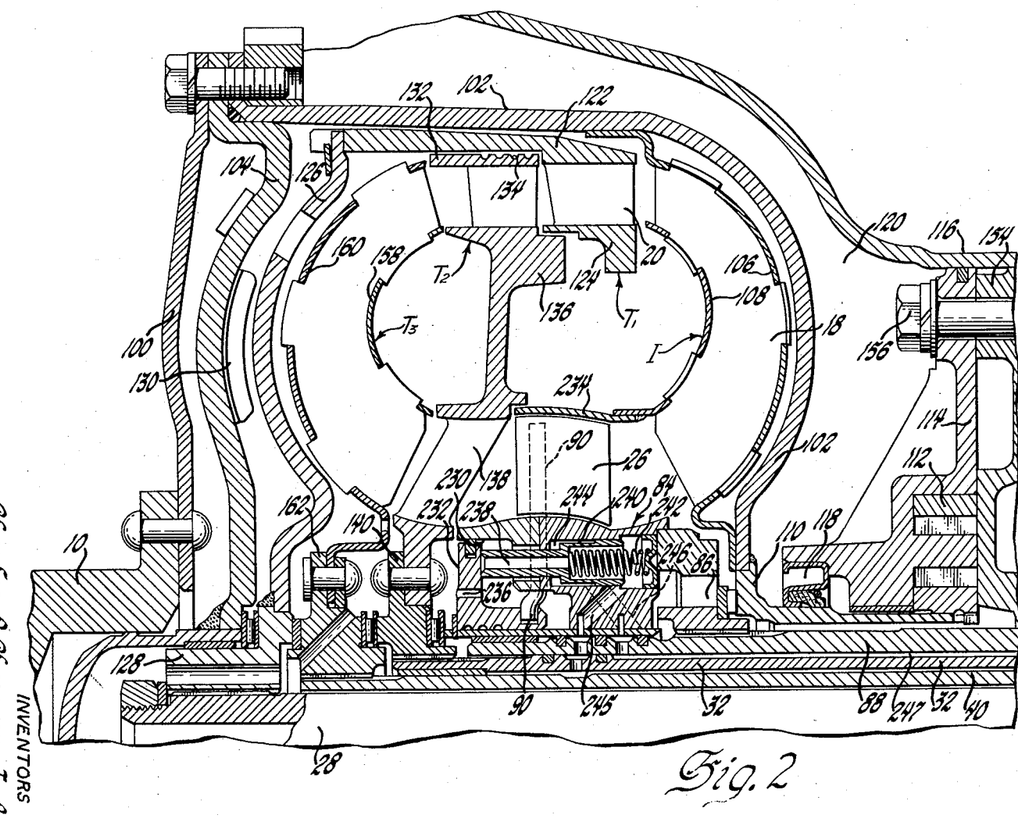
Figure 2A:
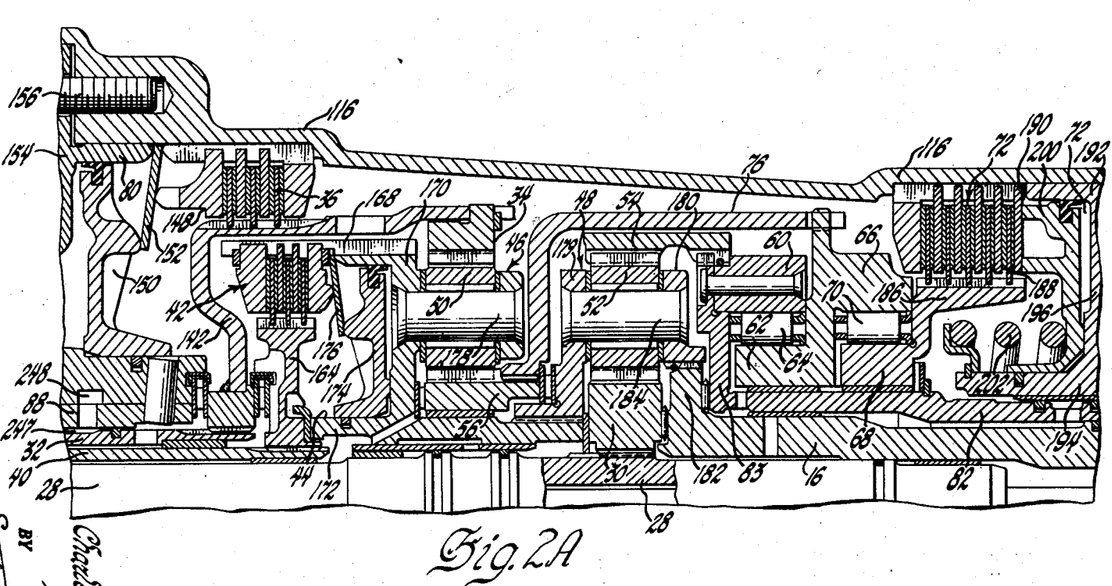
Figure 2B:
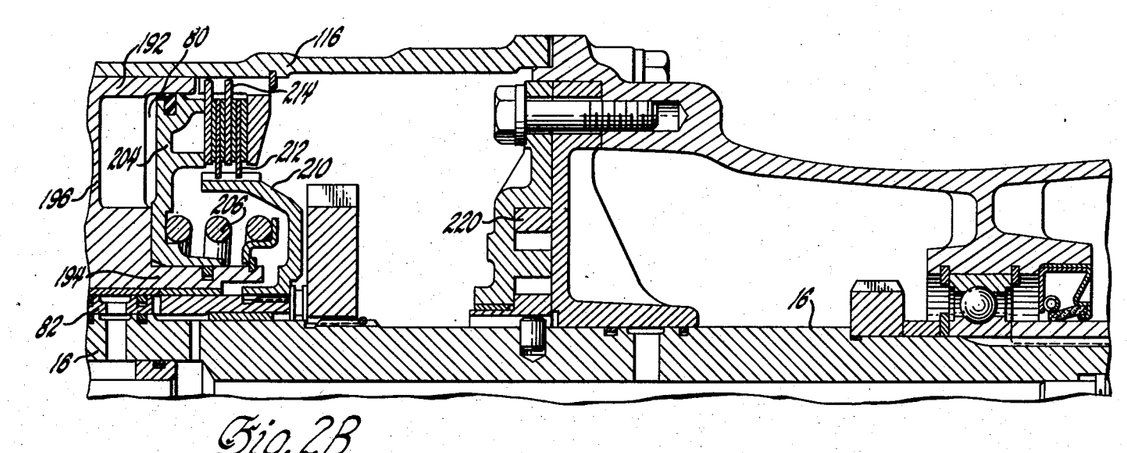

Figs. 2, 2A and 2B show the actual structure of a transmission embodying one form of the invention. Referring first to Fig. 2, the engine shaft 10 is secured to a flywheel 100 bolted to a torque converter casing including a shell 102 and a front cover 104. The impeller blades 18 are attached to an outer impeller shell 106 and to an inner shroud 108. At its center edge the torque converter shell 102 is welded to a tubular shaft 110 which drives the customary front pump 112 enclosed in a flange 114 secured to the stationary casing 116 of the transmission. The impeller shell 106 is secured to the main torque converter shell 102. The shaft 110 is surrounded by a seal 118 which prevents leakage of oil from the torque converter into the dry chamber 120.

The first turbine $T_1$ includes an outer shell 122 and an inner shroud 124 between which the blades 20 are fixed. The outer shell 122 is secured to a flange 126 welded at its center to a hub 128 splined to the innermost shaft 28, which near its rear end as shown in Fig. 2A, is splined to the sun gear 30. The hub 128, and therefore the front end of shaft 28, is supported for rotation by suitable bearings in the front cover 104. The front cover 104 carries on its inner face a number of radial vanes 130 which rotate the liquid in the space between the cover 104 and the first turbine flange 126 at the same speed that liquid is rotating within the working space of the torque converter and thus create outside of the first turbine flange 126 a static centrifugal pressure which balances that within the torque converter.

The second turbine blades are secured between an outer shell 132 having grooves 134 which form a labyrinth seal with the $T_1$ shell 122, and an inner shroud 136 which is fixed to or forms part of a spider 138 riveted to a flange 140 splined to the front end of shaft 32, the other end of which is splined to a drum 142 (Fig. 2A) which in turn is splined to the front reaction ring gear 34. Also the drum 142 carries on its outside splined driven friction plates interleaved between stationary friction plates splined to the casing 116 and forming part of the brake 36 of Fig. 1. The brake 36 may be engaged by a presser plate 148 which can be urged to the right by a piston 150 sliding in the cylinder 80 which is the cylinder 80 of Fig. 1. The piston applies the presser plate through a force multiplying device such as a Belleville spring 152 which forms the return mechanism for the piston. The cylinder 80 is formed in a reaction plate 154 bolted between the flange 114 and a shoulder on the casing 116 by bolts 156. The stationary plates and presser plate 148 are splined to the extended wall of the cylinder 80, the Belleville spring is mounted in an annular depression in the cylinder wall and the arrangement is such that the entire brake and its operating piston and actuating cylinder can be removed as a unit by sliding to the left as Fig. 2A is seen, after removal of the torque converter, flange 114 and bolts 156.

The third turbine blades 24 are supported between an inner shroud 158 and an outer shell 160 riveted to a hub 162 splined to the front end of the shaft 40, the rear end of which is splined to a clutch hub 164 forming part of the neutral clutch 42 and carrying splined driving plates interleaved between driven plates splined to a clutch drum 168 forming part of the front carrier 46. The drum 168 is connected by an annular wall 170 to an inner cylindrical sleeve 172 so as to define an annular cylinder which is the pressure cylinder 44 of Fig. 1 and which receives a piston 174 which can be urged to the left as Fig. 2A is seen by fluid pressure to move a Belleville spring 176 to set the neutral clutch 42. The inner sleeve 172 is supported for rotation on any suitable bearings on the $T_1$ shaft 28 and in turn supports for rotation by any suitable bearing the front reaction sun gear 56. The annular flange 170 carries spindles 178 which support the front planet gears 50. The right end of the sleeve 172 is splined to the front flange 179 forming part of the rear carrier 48 which also includes a rear flange 180 splined to a flange 182 integral with the output shaft 16. The flanges 179 and 180 support spindles 184 on which are journalled the planet gears 52.

The ring gear 54 is splined to the hill brake flange 83 which is formed integral with the hill brake drive shaft 82 and is also riveted to the outer race 60 of the front freewheeler. The outer race 60 carries any suitable rollers or sprags 64 which are the ratchet members 64 of Fig. 1 and which in turn bear on the inner race 62. The inner race 62 is formed integral with the outer race 66 of the rear freewheeler and this integral structure is splined to the drum 76 which is splined to the front sun gear 56. The outer race 66 carries sprags or rollers 70 which are the ratchet members 70 of Fig. 1 and which bear on the inner race 68 which is formed integral with the driving hub 186 of the forward brake 72. This includes driving disks 188 splined to the hub 186 and interleaved between stationary disks 190 splined to the casing 116.

The hydraulic operator for the forward brake 72 includes the pressure chamber 72 formed by an outer cylinder 192 secured to the casing 116, an inner sleeve 194 and a connecting annular web 196. The chamber 72 contains a piston 200 which can be urged to the left against a return spring 202 by fluid pressure to engage the plates 188 and 190 to hold the race 68 of the rear freewheeler. The outer cylinder 192, web 196 and inner sleeve 194 also form the hill brake pressure chamber 80, containing piston 204 which can be urged to the right against a return spring 206 to engage the hill brake as will be presently described. The inner sleeve 194 supports for rotation on suitable bearings the previously mentioned tubular shaft 82 which drives the hill brake and is formed integral with the flange 83 connected to the ring gear 54. At its right end the shaft 82 is splined to a flange 210 to which are splined driven brake plates 212 interleaved between stationary brake plates 214 splined to the casing 116 and forming part of the brake 78 which can be engaged by the piston 204. The sleeve 82 through suitable bearings supports for rotation the left end of the output shaft 16 and also has suitable bearings supporting for rotation races 62 and 68.

As shown in Fig. 2, the stator R includes the previously mentioned stator support generally designated by 84 mounted for rotation on the stationary support 88 of Fig. 1, which takes the form of the ground sleeve or tubular shaft 88 secured to the frame 116. The stator support 84 is prevented from rotating backward by a one-way including any suitable sprags or rollers 86 which are the ratchet members 86 in Fig. 1. The support 84 includes an open ended annular cylinder 230 containing an annular piston 232 having an annular groove which receives the ends of the crankshafts 90 which are journalled in the support 84 for positioning the stator blades 26 which are mounted on the crankshafts outside of the support 84 and between the support 84 and a shroud 234 welded to the impeller shroud 108. Each blade 26 has a greater area on the downstream side of the crankshaft 90 than on the upstream side so that the hydraulic force of oil flowing from the turbines to the impeller tends to turn the blades parallel to the direction in which the oil is flowing, that is, to place them at low angle in which they effect the lowest range of torque multiplication. The blades are urged toward high angle, in which position they effect the highest range of torque multiplication, by the force of oil at the pressure maintained in the converter acting on the left hand or open face of the piston 232 when the cylinder 230 at the right of the piston is empty. The pressure maintained in the converter is such that under all conditions of operation, whenever the cylinder 230 is empty, the piston can move all the way to the right, overcoming the hydraulic force on the blades to place the blades in condition of highest performance. The cylinder 230 is continuously supplied with oil from the converter by a small passage or bleed hole 236 in the piston so that forces on opposite sides of the piston can be balanced, in which condition the blades are held in position of lowest angle by the hydraulic force on the blades. In order to place the blades in higher angle, the cylinder 230 is emptied or partially emptied by a movable exhaust tube or vent pipe 238 which is reciprocable in a bore 240 in the support 84 and is urged toward the left as Fig. 1 is seen by spring 242. The vent pipe 238 may be moved to the right and held against the force of the spring 240 by pressure of oil in a chamber 244 to which oil is admitted and maintained at throttle pressure, which is a measure of torque demand on the engine, as will be described in connection with the control system below. The chamber or cylinder 230 can be vented through the interior of the vent tube 238 which communicates with an exhaust passage 245 constantly open to the interior of the transmission casing at atmospheric pressure. Oil at throttle pressure is constantly admitted to the chamber 244 by passage 246 which communicates with the passage 247 in the space between the ground sleeve 88 and the second turbine shaft 32 which communicates with a control passage 248. The arrangement is such that at all times when the transmission is operating, the position of the vent tube 238 is determined by throttle pressure. This drains oil from the chamber 230 and allows the converter pressure to move the piston 232 to the right as Fig. 2 is seen, until the piston rests against the end of the vent tube 238 to close the vent. This positions the piston in accordance with throttle opening and therefore positions the vanes 26 in accordance with torque demand on the engine. When the piston closes the vent, the pressure on opposite sides of the piston tends to become balanced through the passage 236. Then the hydraulic force on the blades tends to move the blades toward low angle and this moves the piston slightly away from the end of the vent tube. This immediately allows fluid to be drawn through the vent tube from the cylinder 230 and this causes the piston to return to close the end of the vent tube again. Thus, the piston hunts or hovers in a very slight range of movement between complete closure of the vent tube 238 and slight opening of the vent tube. This movement is insufficient to move the vanes significantly, therefore the vanes are held in the position which is determined by the amount of throttle opening as indicated by the pressure in the chamber 244.

This arrangement makes easy exact control of the stator blades regardless of friction between the piston 232 and the cylinder 230 which changes from specimen to specimen of the transmission and varies with temperature and other factors in the same specimen. The tube 238 constitutes a position responsive valve which always determines the exact position of the piston 232 regardless of the amount of force which may be required to move the piston and any variations in this force, provided the pressure in the converter is always sufficient to move the piston as described above. Then the piston always moves to the right until the tube 238 stops venting the chamber 230. The tube 238 in turn can be exactly positioned. The diameter of the tube may be made very small to reduce the friction between the tube and the bore 240. Also the diameter of the chamber 244 is made as large as the dimensions of the stator permit so that the forces of the throttle pressure and of the spring 242 are large with respect to the friction between the tube and the bore. In this way the tube is accurately positioned by throttle pressure and the stator vanes are turned accurately to the corresponding angle and held there.

In order to maintain constant the clearance between the stator vanes 26 and the support 84 on one hand and the shroud 234 on the other hand, the outer surface of the support 84 is formed as a portion of a surface of a sphere whose center is located on the center line of the spindles 90 and the axis of rotation of the transmission. The shroud 234 is similarly formed as the surface of the sphere having the same center. The edges of the blades 26 are formed as circles whose center is the center of the spheres described. In this way as the spindle is turned to position the blades, the clearances between the edges of the blade and the support 84 and the shroud 234 are maintained substantially constant.

Control system

The structure described above can be operated by any suitable controls which select forward, neutral, reverse and hill braking and which place the stator blades in the desired position automatically in response to torque demand on the engine. Referring to Fig. 3A, the front pump 112 when the engine is running constitutes a source of fluid under pressure for supplying the converter with oil and for operating the control system. This pump may be of any suitable known type and in connection with the regulator valve to be described, is adapted to maintain a pressure which is constant for given operating conditions. The system includes means for changing the level of the constant pressure with change of drive conditions, that is forward or reverse and means for modulating or gradually changing the pressure according to torque demand on the engine. The rear pump 220 maintains pressure in the control system when the car is running forward. Both pumps take in oil from a common intake or sump 250 and discharge oil under pressure to a main hydraulic control line 252 through check valves 254 and 256 so that if either pump is not operating, the other pump can maintain the pressure in the system and will not be vented significantly through the idle pump.

Figure 3:
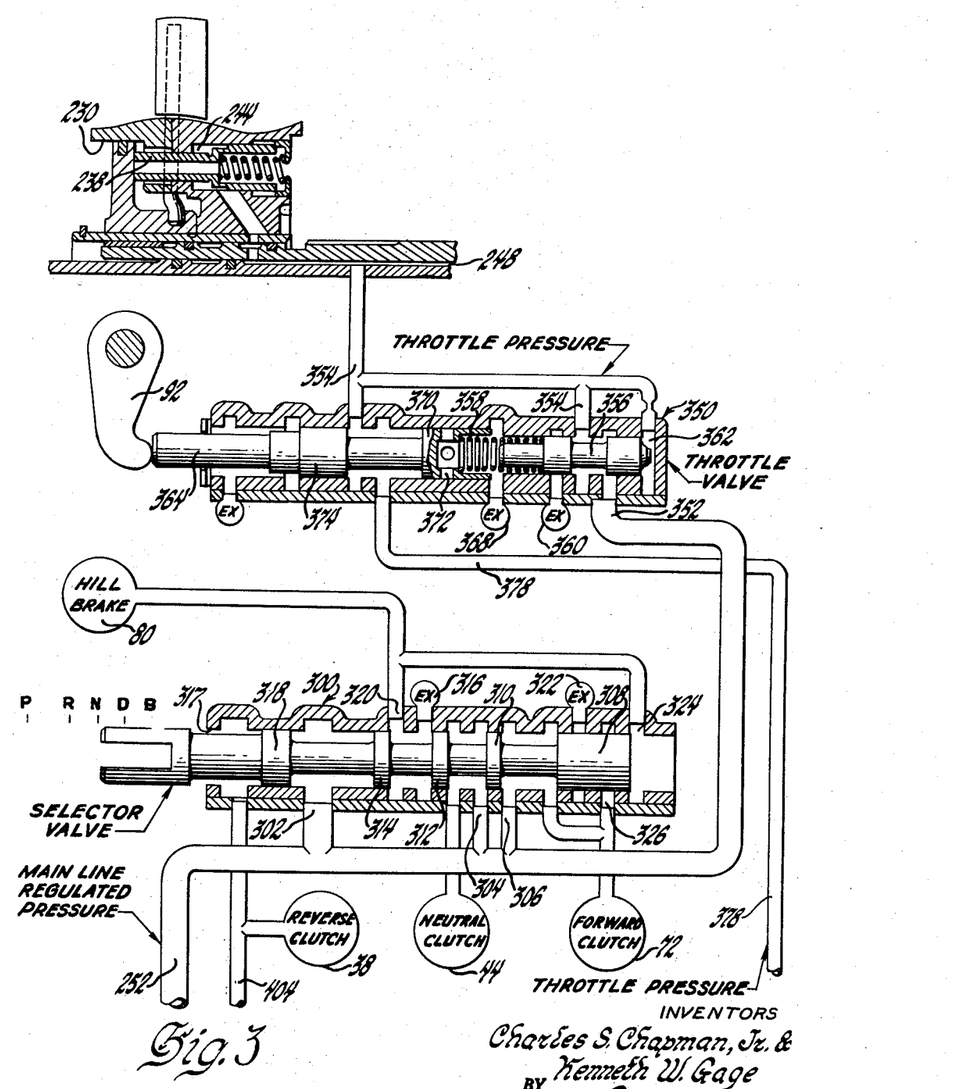
Figure 3A:
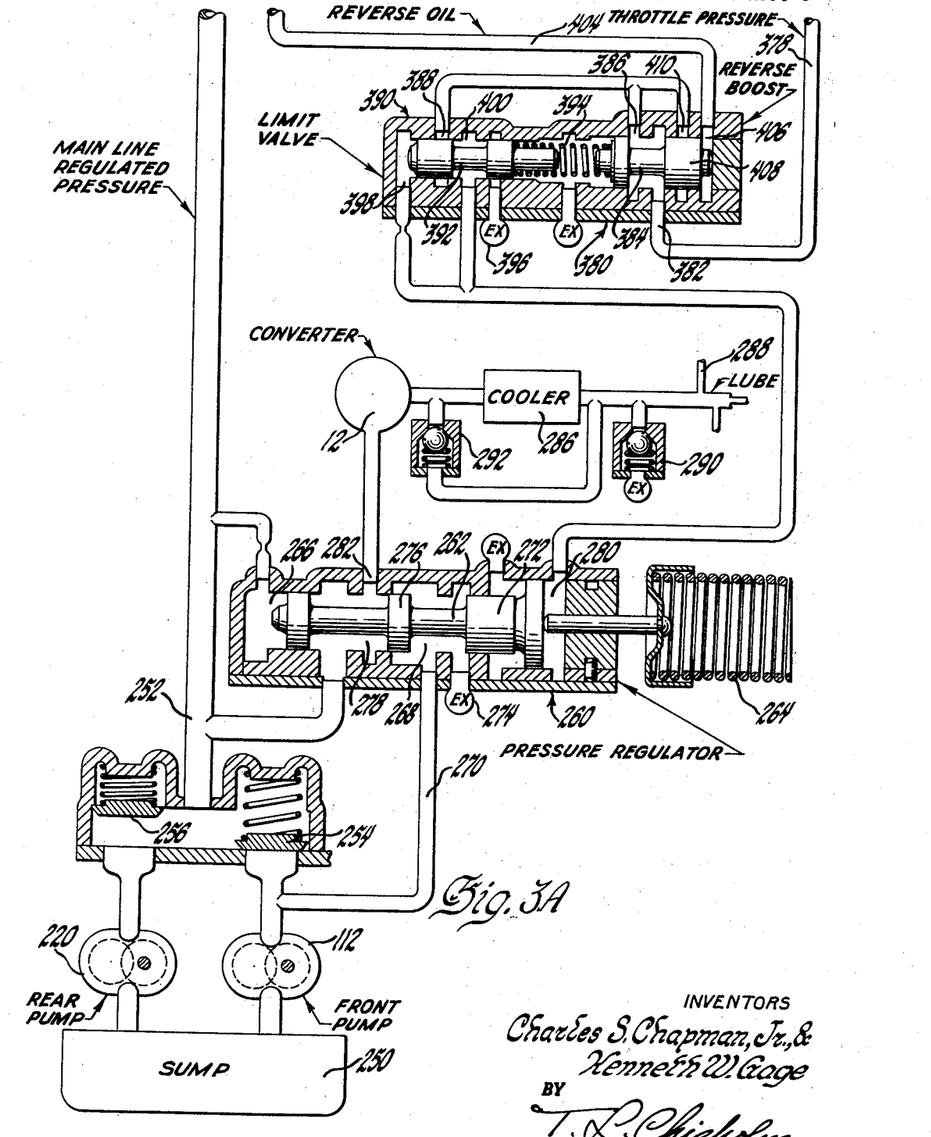

The pressure in the main line 252 is regulated by a main pressure regulator valve 260 which includes a valve stem 262 constantly urged to the left as Fig. 3 is seen, by a spring 264 against the force of pressure in the regulating chamber 266 connected to the main line 252. Pressure in the regulating chamber 266 urges the valve stem to the right with the force which is proportional to the pressure in the main line. The front pump is connected to a pump selector chamber 268 by a conduit 270 between the front pump and the check valve 254. When the pressure of oil from the front pump running alone reaches a predetermined value, the valve stem 262 has moved to the right far enough to permit a land 272 to crack a connection between the chamber 268 and an exhaust port 274. When this occurs, the front pump maintains a constant regulated pressure in the main line. If both pumps are running, the increased capacity due to the rear pump tends to increase the pressure and this pushes the land 272 further to the right, as is shown in Fig. 3A. This vents the front pump, thus reducing the load on the engine and permitting the rear pump to supply the requirements of the system through check valve 256, the check valve 254 being closed. The pressure regulator valve tends to maintain a constant pressure in the line 252 as is known. If the pressure due to rear pump alone tends to increase above a predetermined maximum, the stem 262 moves to the right far enough to permit a land 276 to establish communication between the chamber 268 and a regulated pressure chamber 278 which is connected to the main line 252, and as is known, this tends to vent the main line to the exhaust port 274. If the pressure tends to decrease, the land 276 tends to restrict or close the vent from the chamber 278. This maintains a constant pressure in the main line. However, the pressure may be modulated or adjusted by a modulating chamber 280 to which may be admitted oil under pressure which assists the spring 264 as will be explained.

Oil is supplied to the converter from the regulator valve 260 by a converter supply port 282 which is closed by the land 276 when neither pump is operating but is open by the land 276 when either pump establishes a predetermined low pressure in the main line. This is to ensure that on starting, and when the manual valve is set to engage a friction torque-establishing device, oil will not be directed to the converter in sufficient volume to reduce main line pressure until a sufficient pressure has been built up to ensure the engagement without slipping of any of the friction torque-establishing devices. Oil flows from the converter through a cooler 286 to lubrication passages 288 from which oil returns to the sump 250. The pressure in the lubricating passages is prevented from exceeding any predetermined maximum by a pressure responsive relief valve 290 which discharges oil to the sump whenever the pressure in the lubrication line exceeds the predetermined maximum. If flow through the cooler is restricted as by clogging with dirt or due to high viscosity cold oil, the cooler is by-passed by a pressure relief 292 to provide unrestricted and continuous flow to the lubrication lines 288.

A manual selector valve 300 is supplied with oil from the main line 252 at three inlets 302, 304 and 306. The valve is shown in Fig. 3 in its D or forward drive position in which oil is supplied to the forward brake chamber 72 from the inlet 306 through the groove between lands 308 and 310; oil is supplied to the neutral clutch chamber 44 from the inlet 304 through the groove between lands 310 and 312; the hill brake chamber 80 is vented through the groove between lands 312 and 314 to exhaust port 316; and the reverse brake chamber 38 is vented at the open end 317 of the valve casing to the left of land 318.

When the valve stem is moved one position to the right of that shown in Fig. 3, namely to the B or braking position, the land 314 is positioned between exhaust port 316 and the connection 320 to the hill brake chamber 80; land 312 is positioned between the inlet 304 and the connection to the neutral clutch chamber 44; land 310 is positioned between the inlet 306 and the connection to the forward brake chamber 72; and land 308 uncovers exhaust port 322 but covers the hill brake vent connection 324. This leaves the reverse brake chamber 38 vented as in forward drive; supplies the hill brake chamber 80 with oil from inlet 302 through groove between lands 314 and 318 and the hill brake chamber inlet 320; vents the neutral clutch chamber 44 by cutting off the chamber from the oil inlet 304 and connecting the chamber to exhaust port 316 through the groove between lands 312 and 314; and releases the forward brake by blocking the supply to the chamber 72 from inlet 306 by land 310 and connecting the chamber 72 to exhaust port 322 by the groove between lands 308 and 310.

If the valve is moved one position to the left of that shown in Fig. 3, namely to the N or neutral position, the land 312 is positioned between the hill brake inlet 320 and the exhaust port 316, the land 310 is positioned between the inlet 304 and the neutral clutch chamber 44 and the left end of land 308 is positioned between the inlet 306 and the connection to the forward brake chamber 72, the righthand end of the land 308 uncovers the hill brake exhaust port 324, therefore, in this position the valve cuts off the supply of oil to all servos and vents all servos. The reverse brake servo is vented through the open end 316 of the valve, the forward brake chamber 72 is vented at forward brake vent port 326 now uncovered by the land 308, the neutral clutch chamber 44 is vented through the space between lands 310 and 312 to the exhaust port 316 and the hill brake chamber 80 is vented at port 324 uncovered by land 308.

If the valve is moved two positions to the left of that shown in Fig. 3, namely to the reverse or R position, the land 318 closes the exhaust port 317 and permits oil to be supplied to the reverse brake chamber 38 from the inlet 302 through the groove between lands 314 and 318; the hill brake chamber 80 remains vented as in neutral through port 324; the neutral clutch chamber is supplied from the inlet 304 through the groove between lands 310 and 308; land 308 cuts off the forward brake inlet 306 and the forward brake is vented through 326.

It is customary to have the manual valve operated by any suitable linkage (not shown) which also operates the parking brake or lock. Such linkage sets the parking brake when the manual valve is in the position P indicated in Fig. 3. In this position, the manual valve also establishes neutral by releasing all friction torque-establishing devices.

A throttle pressure control valve 350 is supplied with oil at line pressure by inlet 352 and delivers to an outlet 354 oil at a pressure which is proportional to the amount of throttle opening. The throttle valve 350 includes a regulating valve stem 356 which a spring 358 urges to the right as Fig. 3 is seen, to open the inlet 352 from the main line. The stem is urged to the left to close inlet 352 and open an exhaust port 360 by the force of oil in a regulating chamber 362 connected to the outlet 354. The force of spring 358 is adjusted by a plunger 364 urged to the right by the arm 92 connected to the throttle valve of the engine. This arrangement maintains in the outlet conduit 354 a pressure which is a function of the throttle opening of the engine. This is one example of known devices for maintaining a pressure, herein called throttle pressure, which is a function of torque or power demand on the engine.

The throttle plunger 364 includes a land 370 having a recess in its right-hand end to receive the spring 358 and having bores 372 communicating with the recess and hence with an exhaust port 368. The plunger 364 also has a land 374 separated from the land 370. When the throttle is open more than about 16° the stem 364 is as shown in Fig. 3, conducting throttle pressure from the regulated pressure outlet 354 to a reverse boost and limit valve 380 by way of a throttle pressure conduit 378. At less than 16° throttle opening the land 370 closes throttle pressure conduit 378, and at closed throttle the bores 372 vent the conduit 378. When the conduit 378 is supplied, that is at all throttle openings beyond 16°, oil at throttle pressure enters the reverse boost and limit valve 380 at port 382, passing around a valve stem 384 and leaving by port 386 which communicates with an inlet port 388 of a regulator limit valve 390 which is part of the valve 380. The limit valve includes a valve stem 392 urged to the left to open the inlet 388 by a spring 394 and is urged to the right to close the inlet and open an exhaust port 396 by the pressure of oil in a regulating chamber 398 which is connected to the regulated pressure chamber 400.

When the throttle is open more than 16° in all forward drive, the valve stem 384 is against the right end of the casing of valve 380, acting as an abutment for the spring 394. The force of the spring is so chosen with respect to the range of pressures maintained by the throttle valve 350 that the throttle pressure is not enough to close the inlet 388 and open the exhaust 396 until the throttle is open about 40°. This may represent a throttle pressure of about 41 pounds per square inch for example. Therefore at throttle openings between 16° and 40° the varying throttle pressure is transmitted through the limit valve 390 and maintained in the modulating chamber 280 to cause the main regulating valve 260 to vary line pressure according to throttle opening and hence according to torque demand on the engine.

Whenever the throttle is open more than 40°, the pressure maintained by it through the line 378 in the chamber 400 in the limit valve 390 is sufficient to cause the force in the regulating chamber 398 to close the inlet 388 and open slightly the exhaust port 396. At this point the valve 390 begins to regulate and maintains a constant pressure in chambers 400 and 280 for all throttle openings above 40°. This pressure is determined by the force spring 394 and may be for example 41 pounds per square inch.

Figure 4:
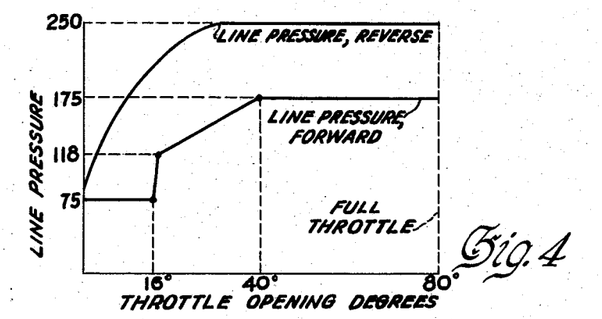
Fig. 4 is a diagram of oil pressures at various throttle openings.

This arrangement maintains a line pressure which follows in Figure 4 the line marked "line pressure forward." The spring 264 of the main pressure regulating valve 260 may be set so that when there is no pressure in the modulating chamber 280, a constant pressure of 75 pounds per square inch for example, is maintained in the main line 252. This pressure is maintained constant until opening of the throttle control valve 350 to of the throttle 16° causes the throttle control valve 350 to supply throttle pressure to the valve 390. This is transmitted to the chamber 280 of the main pressure regulating valve 260 where it abruptly increases the pressure main line to a value of about 118 pounds for example. Thereafter and until the throttle opening of 40° is reached, the pressure in the main line is maintained proportional to throttle opening by the varying pressure in the modulating chamber 280 and the pressure main line follows the curve as shown on Fig. 4, from 118 pounds per square inch at substantially 16° throttle opening to 175 pounds per square inch at 40° throttle opening after which the pressure is maintained constant as explained above.

For reverse operation, throttle pressure is cut off from the limit valve 390 and the limit valve is arranged to supply to the modulating chamber 280 of the main regulating valve 260 a higher constant pressure which boosts the pressure of the main line to provide increased pressure for holding the friction torque-establishing devices engaged. When the manual valve is set for reverse, oil at line pressure which is supplied to the reverse brake 38 also flows by way of conduit 404 to the chamber 406 at the right of the valve stem 384. This pushes the valve stem 384 as far to the left as it will go causing the land 408 to block the inlet 382 from the throttle pressure line 378 and establishing communication between line 404 and port 410 which leads to the limit valve inlet 388. Movement of the valve stem 384 to the left also increases the force on the spring 394. This supplies to inlet port 388 oil at a pressure higher than the throttle valve pressure of about 41 pounds, and increases the tension on the spring 394 so that the valve 390 will now maintain in the chamber 400 a constant pressure higher than the throttle valve pressure at the point of cut off. This assists the spring 264 and maintains in the main line a high pressure. This high pressure is theoretically constant and may be, for example 250 pounds per square inch. However, it may be that due to the limiting factors of capacity of the pumps 112 and 220 and to leakage in the system, the pressure in the main line 252 may not build up instantly to its maximum value but may require higher pump speeds which can be influenced by throttle opening before the maximum of 250 pounds can be reached. Therefore, the line pressure in reverse may follow the curve in Fig. 4 marked "line pressure reverse," starting at 75 pounds per square inch at zero throttle opening, rapidly approaching the maximum value of 250 pounds as indicated by the curve and reaching the maximum at some throttle opening between 16° and 40°. It will be noted that for all throttle openings, the line pressure in reverse is well above value of line pressure forward.

The throttle pressure control valve 350 is the mechanism by which the stator blades 26 are positioned in accordance with the torque demand on the engine. The regulated pressure outlet 354 of the throttle control valve 350 is connected to the previously mentioned passage 248 which leads to the throttle pressure chamber 244 in the stator cylinder 230. This maintains constantly in the chamber 244 a pressure which is proportional to throttle opening and this positions the vent pipe 238 as above described, to maintain blades 26 in a position which is determined by throttle opening. The throttle control valve may be constructed and arranged to maintain a stator control pressure which varies between 2 pounds per square inch at zero throttle and 70 pounds per square inch at full throttle.

As used in the claims herein the term driving shaft or power input shaft refers to a rotatable member which delivers power into the transmission or into a part of it, examples being the engine shaft 10 and any of the turbine shafts 28, 32 and 40. The term output shaft, or driven shaft, means a rotatable member which delivers power out of the transmission or out of a part of it. Thus, with respect to the torque converter itself the engine shaft is an input shaft while each of the shafts 28, 32 and 40 is an output shaft. With respect to the planetary gearing the shafts 28, 32 and 40 are input shafts. The shaft 16 is the output shaft of the gearing and of the transmission as a whole. Power flows from an input shaft to an output shaft either by direct connection, such as the neutral clutch 42 connecting input shaft 40 and output shaft 16, or through intermediate devices such as the impeller and a turbine or gearing. Thus, power flows from the input shaft 10 to output shafts 28, 32 and 40 through the impeller I and the turbines $T_1$, $T_2$ and $T_3$. Power flows from the input shafts 28, 32 and 40 to the output shaft 16 through the gearing. Power flows from the input shaft 10 to the output shaft 16 through the impeller, turbines, shafts 28, 32 and 40 and the gearing. The friction torque establishing devices establish driving connections or torque transmitting connections between an input shaft and an output shaft. Thus, the clutch 42 establishes a torque transmitting connection between input shaft 40 and the output shaft 16. Likewise, the clutch 42 establishes a torque transmitting connection between input shaft 10 and output shaft 16 whenever the engine is running because shaft 10 is driving shaft 40 through the impeller and third turbine $T_3$ and the clutch 42 in establishing connection between the shaft 40 and the shaft 16 completes the driving connection between shaft 10 and shaft 16. Likewise, the forward friction torque-establishing device 72 and the reverse friction torque-establishing device 36 each establishes a driving connection between the input shaft 10 and the output shaft 16 whenever the engine is running because shaft 10 is driving shafts 28, 32 and 40 and the friction torque-establishing device 72 or 36 sustains a torque reaction which causes shafts 28, 32 and 40 to drive shaft 16, and thus completes the power train.

We claim:

1. A transmission for transmitting torque to a load from an engine which has means for indicating torque demand on the engine comprising in combination; an input shaft; an output shaft; pressure-actuated torque sustaining means adapted to establish a driving connection between the input shaft and the output shaft; a first source of pressure fluid for actuating the torque-sustaining means; a first pressure-responsive regulator adapted to maintain the pressure of the source at one substantially constant value; a pressure-responsive modulator for the regulator adapted to vary the pressure of the source; a second source of fluid at a varying pressure measured by the torque demand on the engine; a conduit connecting the second source to the modulator; a second pressure regulator in the conduit, the second pressure regulator including means for conducting to the modulator fluid at a varying pressure measured by the torque demand on the engine and means responsive to an increase of pressure of the second source above a predetermined value for maintaining in the modulator a substantially constant pressure; and means for disconnecting the modulator from the second source and connecting the modulator to the first source.

2. A transmission for transmitting torque to a load from an engine which has means for indicating torque demand on the engine comprising in combination; an input shaft; an output shaft; a plurality of pressure-actuated torque-sustaining means adapted to establish different driving connections between the input shaft and the output shaft; a first source of pressure fluid for actuating the torque-sustaining means; means for selecting the torque-sustaining means; a first pressure responsive regulator adapted to maintain the pressure of the source at one substantially constant value; a pressure-responsive modulator for the regulator adapted to vary the pressure of the source; a second source of fluid at a varying pressure measured by the torque demand on the engine; a conduit adapted to connect the second source to the modulator in response to selection of one of said torque-sustaining means; a second pressure regulator in the conduit, the second pressure regulator including means for conducting to the modulator fluid at a varying pressure measured by the torque demand on the engine and means responsive to an increase of pressure of the second source above a predetermined value for maintaining in the modulator a substantially constant pressure; and means responsive to selection of a second of said torque-sustaining devices for disconnecting the modulator from the second source and connecting the modulator to the first source.

3. A transmission for transmitting torque to a load from an engine which has means for indicating torque demand on the engine comprising in combination, an input shaft; an output shaft; a plurality of pressure-actuated torque-sustaining means adapted to establish different driving connections between the input shaft and the output shaft; means for selecting the torque-sustaining means; a first source of pressure fluid for actuating the torque-sustaining means; a pressure-responsive regulator adapted to maintain substantially constant the pressure of the source; pressure-responsive modulating means adapted to vary the response of the regulator to vary the pressure of the source; a second source of fluid at a pressure which varies with the torque demand on the engine; a pressure-regulating device having a valve, an inlet connected to the second source in response to selection of one of said torque-sustaining means, a vent, an outlet connected to the modulating means, a spring urging the valve to open the inlet and close the vent, and a pressure chamber connected to the outlet and adapted to urge the valve to close the inlet and open the vent, the spring being adapted to hold the valve in position to open the inlet and close the vent throughout a predetermined range of values of torque demand on the input shaft, and the pressure chamber being adapted to close the inlet and open the vent and thereafter maintain a constant pressure in the outlet when the torque demand exceeds the maximum of said predetermined range, a second valve normally permitting communication between the second source and the inlet, pressure-actuated means for moving the second valve to interrupt communication between the second source and said inlet and to connect the first source and the inlet; means responsive to selection of another torque-sustaining means for supplying pressure fluid to the last-named pressure-actuated means, and means responsive to said movement of the valve for increasing the force of the spring.

4. A transmission for transmitting torque to a load from an engine which has means for indicating torque demand on the engine comprising in combination, an input shaft; an output shaft; a plurality of pressure-actuated torque-sustaining means adapted to establish different driving connections between the input shaft and the output shaft; means for selecting the torque-sustaining means; a first source of pressure fluid for actuating the torque-sustaining means; a first pressure-responsive regulator adapted to maintain substantially constant the pressure of the source; pressure-responsive modulating means adapted to vary the response of the regulator to vary the pressure of the source; a second source of fluid at a pressure which varies with the torque demand on the engine; a pressure-regulating device having a valve, an inlet connected to the second source in response to selection of one of said torque-sustaining means, a vent, an outlet connected to the modulating means, a spring urging the valve to open the inlet and close the vent, and a pressure chamber connected to the outlet and adapted to urge the valve to close the inlet and open the vent, the spring being adapted to hold the valve in position to open the inlet and close the vent throughout a predetermined range of values of torque demand on the input shaft, and the pressure chamber being adapted to close the inlet and open the vent and thereafter maintain a constant pressure in the outlet when the torque demand exceeds the maximum of said predetermined range, a second valve normally permitting communication between the second source and the inlet and adapted to be moved to interrupt communication between the second source and said inlet and to connect the first source and the inlet; means responsive to selection of another torque-sustaining means for moving the valve and means responsive to said movement of the valve for increasing the force of the spring.

References Cited in the file of this patent

UNITED STATES PATENTS

| | | |
|---|---|---|
| 2,663,393 | Livermore | Dec. 22, 1953 |
| 2,770,148 | Wayman | Nov. 13, 1956 |